United States Patent [19]

Hisatake et al.

[11] Patent Number: 4,859,917

[45] Date of Patent: Aug. 22, 1989

[54] SPEED CONTROL DEVICE FOR AN ELECTRIC SEWING MACHINE

[75] Inventors: Michio Hisatake, Kanagawa; Satoru Ishikawa, Tokyo, both of Japan

[73] Assignee: Janome Sewing Machine Co. Ltd., Tokyo, Japan

[21] Appl. No.: 73,692

[22] Filed: Jul. 8, 1987

[30] Foreign Application Priority Data

Jul. 10, 1986 [JP] Japan .................. 61-105015[U]

[51] Int. Cl.⁴ .................................................. H02P 5/00
[52] U.S. Cl. ....................................... 388/815; 364/174
[58] Field of Search .................. 318/308, 311–317,
   318/341–342, 345 E, 385–387; 364/148–150, 167, 174

[56] References Cited

U.S. PATENT DOCUMENTS

| 4,386,301 | 5/1983 | Neki et al. .................. 318/345 E |
| 4,486,693 | 12/1984 | Hamati et al. ................ 364/174 |
| 4,488,103 | 12/1984 | Morinaga et al. ............. 364/174 |
| 4,556,001 | 12/1985 | Neki et al. .................. 318/345 E |
| 4,680,515 | 7/1987 | Crook ........................ 318/341 |

Primary Examiner—William M. Shoop, Jr.
Assistant Examiner—David S. Martin
Attorney, Agent, or Firm—Michael J. Striker

[57] ABSTRACT

A delay circuit is realized by a program, instead of a conventional one of a hard system, so that if a pedal controller is rapidly stepped, a suitable speed acceleration or reduction curve may be always provided and the delay circuit is not affected by changes in temperatures or variations in passing time.

11 Claims, 2 Drawing Sheets

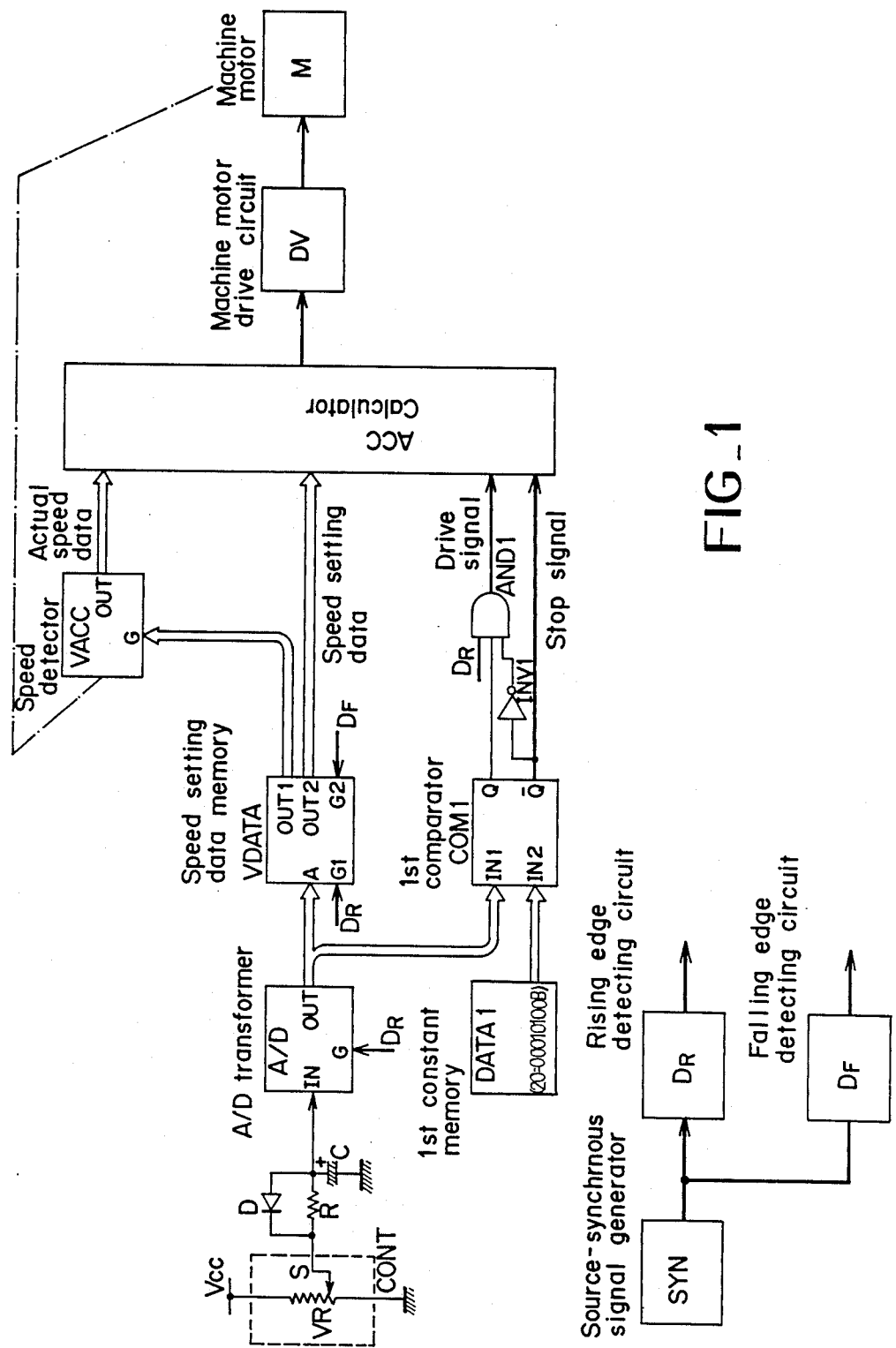
FIG_1

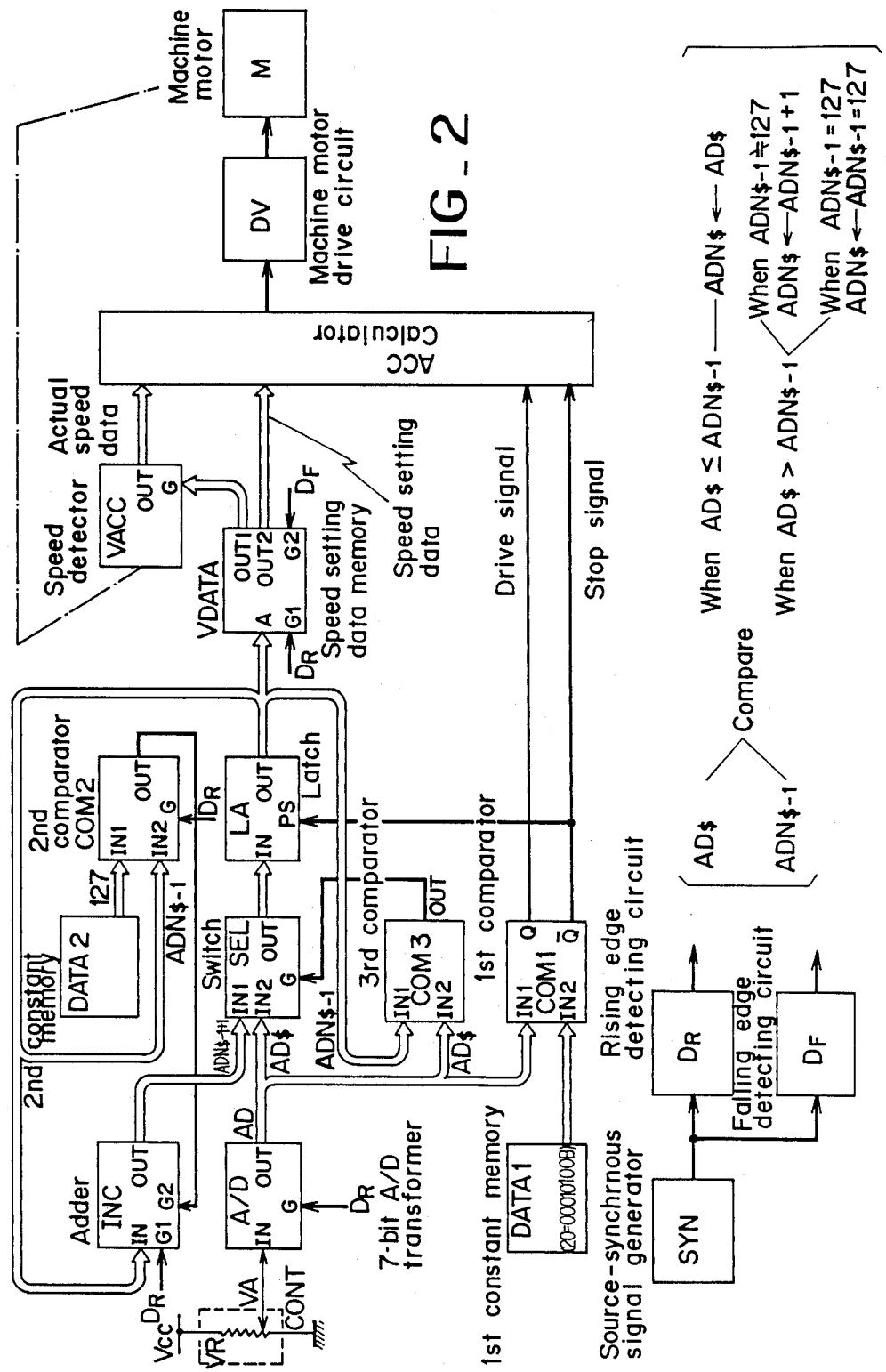

SPEED CONTROL DEVICE FOR AN ELECTRIC SEWING MACHINE

BACKGROUND OF THE INVENTION

1. FIELD OF THE INVENTION

This invention relates to a speed control device for an electric sewing machine, and more particularly to a device for controling speed acceleration and reduction of a machine motor of a sewing machine.

In the electric sewing machine having a circuit for feeding back a present value to a designated rotation number, when a pedal controller is stepped rapidly, the sewing machine is rotated at high speed instantaneously, which gives a machine operator an uneasy feeling.

Due to time lag in a feedback system, the rotating number is overshot, and the rotation is higher or lower than the designated number for a while.

FIG. 1 shows one example of a controlling block diagram of a conventional electric sewing machine.

An analog voltage from a controller (CONT) is input into an A/D converted (A/D) at IN thereof, and an input is A/D converted. A converted digital data is an address data in a speed setting data memory (VDATA) and is given as speed setting data to a calculator (ACC), and compared with an actual speed data issued from a speed detector (VACC), thereby to control conduction time of a semi-conductor element installed in a machine motor drive circuit (DV), so that a machine motor (M) is controlled to have rotation number in response to an input of an input terminal (IN) of the A/D converter (A/D).

Therefore, in order to settle the above mentioned inconvenience, a delay circuit between a resistor (R) and a condensor (C) is provided between a slide terminal (S) of a variable resistor (VR) within the controller (CONT) and an input terminal (IN) of the A/D converter (A/D), whereby the voltage of the input terminal (IN) of the A/D converter (A/D) is not rapidly increased if the pedal controller (CONT) is rapidly stepped. A diode (D) is provided for instantly changing a level of the input terminal (IN) of the A/D converter (A/D) into OV, when the controller (CONT) is released.

Even if the controller (CONT) is suddenly stepped, a time constant to be determined by a value between the resistor (R) and the condensor (C) realizes smooth speed acceleration, so that the machine operator does not feel uneasy or the rotation number is not overshot.

The time constant of the delay circuit is determined by the value of the resistor (R) and the condensor (C). If the value is changed due to dispersions per each of products, changes in temperatures or variations in passing time, the machine motor (M) does not run at the designed accelerating curve.

SUMMARY OF THE PRESENT INVENTION

The present invention realizes a delay circuit by a program so as to have a constant speed acceleration curve at all times, and may cancel a delay circuit of a hard system to lower costs.

BRIEF DESCRIPTION OF THE DRAWINGS

FIG. 1 is a block diagram of the prior art; and
FIG. 2 is a block diagram for exemplifying the invention.

DETAILED DESCRIPTION OF PREFERRED EMBODIMENT OF THE INVENTION

The present invention will be explained with reference to FIG. 2 of the drawings showing the controlling block diagram, in which controlling element parts are realized by a program of a microcomputer.

An A/D converter (A/D) converts, each time a gate terminal (G) is "H", an analog voltage of an input terminal (IN) into a 7-bit digital value, and issues it to an output terminal (OUT).

A speed setting data memory (VDATA) supplies a speed setting data addressed at an input terminal (A) each time a gate terminal (G1) is "H", from an output terminal (OUT2) to a calculator (ACC) when a gate terminal (G2) is "H", and supplies data (a speed reading-out cycle data) which designates cycle number of a speed detecting signal, from an output terminal (OUT1) to a speed control detector (VACC).

The speed detector (VACC) counts a clock number in cycles of the speed signal, by a speed reading-out cycle data given by the speed setting data memory (VDATA), and gives it to the calculator (ACC).

When a later mentioned drive signal is "H", the calculator (ACC) controls conduction time of a semi-conductor element installed in the machine motor drive circuit (DV) in dependence upon speed setting data and an actual speed data that is fed back for driving the machine motor (M) at the designated rotation number i.e. speed of rotation. The detail therefor is disclosed in Laid-Open No. 8789/87 of Japanese Patent Application No. 146,633/85 for "Speed control device of a machine motor" by the same inventors.

An electric source synchronous signal generator (SYN) issues "L" signal, each time 0 potential is between terminals of AC source.

A rising edge detecting circuit (DR) and a falling edge detecting circuit (DF) respectively detect rising and falling of the electric source synchronous signal, and issue "H" pulses and make timings for the processing devices by said pulse.

A 1st comparator (COM1) compares digital data of the 7-bit A/D converter (A/D) with a constant of a 1st constant memory (DATA1) (the machine motor (M) is started by stepping of VA=20/128 Vcc, and the constant is 20=00010100B). If the digital data is equal to or larger than the constant, the output terminal (Q) is "H" level, and if the former is smaller than the latter, an inversion output terminal ($\bar{Q}$) is "H" level. A signal from the inversion output terminal ($\bar{Q}$) is a stop signal which stops the machine motor (M) via the calculator (ACC). A signal from the output terminal (Q) is a drive signal which actuates the calculator (ACC) and drives the machine motor (M) to have the designated rotation number.

A latch device (LA) latches the digital data given to the input terminal thereof until a following data is received. This output data will be an address data of the speed setting data memory (VDATA), and used for a following addressing, which will be made ADN.

When a preset terminal (PS) is "H", that is, when the stop signal is issued, the latch device (LA) latches 20=00010100B corresponding to A/D value of the minimum level under a driving condition, in spite of the input.

A 2nd comparator (COM2) compares, each time a gate terminal (G) thereof is "H", a preceding ADN value, that is, $ADN_{s-1}$ with the constant of the 2nd constant memory (127=01111111B which is the maximum A/D value of the controller, is stored). If the ADN value is smaller than the constant, the output terminal (OUT) is "H", and if the former is equal to the latter, it is "L".

An adder (INC) increments a digital value $ADN_{S-1}$ of the input terminal (IN) when the gate terminal (G1) is "H", and issues an outputs of $ADN_{S-1+1}$. But the adder (INC) does not increment it when an output signal from the 2nd comparator, that is, a gate terminal (G2) of the adder (INC) is "L", and issues outputs of $ADN_{S-1}$ continuously.

A 3rd comparator (COM 3) compares an output $ADN_{S-1}$ from the latch device (LA) with an output $AD_S$ of the 7-bit A/D transformer (A/D). Depending upon a result thereof, either one of two inputs of a switch device (SEL) is supplied to the latch device, and makes a new $ADN_S$.

When $AD_S \leq ADN_{S-1}$, $ADN_S \leftarrow AD_S$.

When $AD_S > ADN_{S-1}$, $ADN_S \leftarrow ADN_{S-1}+1$ (Explanation of actuation)

(i) Controller is released:

$VA=0V$, and therefore since AD=00000000B, the stop signal is issued from the 1st comparator (COM1), and the machine motor (M) is stopped, and the latch device (LA) is initially set by the stop signal, with the minimum speed setting address values 20 under a driving condition.

(ii) When the controller is rapidly stepped:

VA becomes Vcc instantaneously, that is, 127 of AD value. But since $AD_S > ADN_{S-1}$, $ADN_S$ is larger than the initial value 20 by 1 each time the source synchronizing signal is issued, and the motor (M) starts softly and the maximum speed is set after about 1 second. This is similar, also when stepping the pedal controller (CONT) is stepped at the low speed.

(iii) When the controller is stepped slightly

When $AD_S \leq ADN_{S-1}$, $ADN_S \leftarrow AD_S$, and the speed goes down as designated by the controller (CONT), and when the controller is released, the motor (M) is stopped soon.

If addition rate of the adder (INC) is changed, or if the source synchronizing signal corresponding to a clock signal thereof is changed with another oscillator, a suitable acceleration curve may be always made without being affected by changes in temperatures or variations in passing time. Since the delay circuit is realized by the program, the delay circuit by the hard system as in the prior art may be cancelled.

What is claimed is:

1. A speed control device of an electric sewing machine that has an upper shaft and a motor for rotating the upper shaft, the device comprising:

means for variably designating a speed of rotation of the motor to output a designated speed of rotation;

speed setting memory means for storing speed setting data and having speed setting data currently addressed therein;

detecting means for detecting a speed of the motor;

drive circuit means responsive to said speed setting memory means and said detecting means for controlling an ignition voltage with respect to the motor; and calculation circuit means for addressing said speed setting memory means with updated speed setting data in dependence upon the designated speed of rotation, said calculation circuit means including comparator means comparing the speed setting data currently addressed in the speed setting memory means with the designated speed of rotation, said calculation circuit means being formed to operate in synchronism with an electric source synchronous signal to produce incremented speed setting data which is an incrementation of the speed setting data currently addressed in the speed setting memory means in response to said comparator means and to assign the updated speed setting data with the incremented speed setting data when the designated speed of rotation is greater than the speed setting data currently addressed in the speed setting memory means, said calculating circuit being responsive to said comparator means to assign the updated speed setting data with the designated speed of rotation when the designated speed of rotation is at most equal to the speed setting data currently addressed in the speed setting memory means.

2. The device as defined in claim 1, wherein said calculation circuit means includes latch means for latching onto speed setting data received as input, and latch means addressing latched speed setting data as the updated speed setting data to said speed setting data memory means and addressing the latched speed setting data as the speed setting data currently in said speed setting memory means to sid comparator means.

3. The device as defined in claim 2, wherein said calculation circuit means includes a first constant memory having a minimum constant speed value and first comparator means comparing said minimum constant speed value with the designated speed of rotation, both said drive circuit means and said latch means being responsive to said first comparator means when the designated speed of rotation is less than said minimum constant speed value so that said drive circuit means stops said motor and said latch means latches onto said minimum constant speed value to constitute the latched speed setting data, said drive circuit means being formed to drive said motor to the designated speed of rotation in response to said first comparator means when the designated speed of rotation is at least equal to said minimum constant speed value.

4. The device as defined in claim 3, wherein said calculation circuit means includes a second constant memory having a maximum constant speed value and second comparator means comparing said maximum constant speed value with the designated speed of rotation, said calculation circuit means also including an incrementer responsive to said second comparator to increment the latched speed setting data into the incremented speed setting data only when the maximum constant speed value is greater than the designated speed of rotation.

5. The device as defined in claim 4, wherein said calculation circuit includes a third comparator means comparing the latched speed setting data with the designated speed of rotation, said calculation circuit means also including switch means responsive to said third comparator means to output updated speed setting data to said latch means as the designated speed of rotation from said variably designating means when the designated speed of rotation is at most equal to the latched speed setting data and to ouput updated speed setting data as the incremented speed setting data from said incrementer when the designated speed of rotation is greater than the latched speed setting data.

6. The device as defined in claim 1, wherein said means for variably designating includes pedal control means for variably designating an analog value indicative of a desired rotational speed of the motor, said variably designating means also including analog to digital converter means for transforming said analog value into a digital value.

7. The device as defined in claim 1, wherein said drive circuit means includes calculator means responsive to said speed setting data memory means and said motor speed detecting means for controlling a speed of the motor.

8. A speed control device of an electric sewing machine that has an upper shaft, the device comprising:
   a motor for rotating the upper shaft;
   drive circuit means for controlling an ignition voltage with respect to said motor;
   pedal stepping control means for variably designating an analog value indicative of a desired rotational motor speed;
   means for converting said analog value into a digital value;
   speed setting data memory means for storing an address value;
   means for detecting a rotational speed of the motor;
   drive circuit means responsive to said speed setting data memory means and said detecting means for rotating the motor at the designated speed and including a semiconductor and a calculator, said calculator being formed to control a conductive time of said semi-conductor element so as to rotate said motor at the designated speed of rotation; and
   calculation circuit means operating in synchronism with an electric source synchronous signal for comparing said digital value ($AD_S$) with said address value ($ADN_{S-1}$), said calculation circuit means incrementing said address value ($ADN_{S-1}$) into a new address value ($ADN_{S-1+1}$) and addressing said speed setting memory means with said new address value ($ADN_{S-1+1}$) if said digital value ($AD_S$) is greater than said first-mentioned address value ($ADN_{S-1}$), said calculation circuit means addressing said speed setting memory means with said digital value ($AD_S$) if said digital value ($AD_S$) is less than said first-mentioned address value ($ADN_{S-1}$).

9. A speed control device of an electric sewing machine that has an upper shaft and a motor for rotating the upper shaft, the device comprising:
   means for variably designating a speed of rotation of the motor to output a designated speed of rotation;
   speed setting memory means for storing speed setting data and having speed setting data currently addressed therein;
   detecting means for detecting a speed of the motor;
   drive circuit means responsive to said speed setting memory means and said detecting means for controlling an ignitiion voltage with respect to the motor;
   calculation circuit means for addressing said speed setting memory means with updated speed setting data in dependence upon the designated speed of rotation, said calculation circuit means including comparator means comparing the speed setting data currently addressed in the speed setting memory means with the designated speed of rotation, said calculation circuit being formed to produce incremented speed setting data which is an incrementation of the speed setting data currently addressed in the speed setting memory means in response to said comparator means and to assign the updated speed setting data with the incremented speed setting data when the designated speed of rotation is greater than the speed setting data currently addressed to the speed setting memory means, said calculating circuit means being responsive to said comparator means to assign the updated speed setting data with the designated speed of rotation when the designated speed of rotation is at most equal to the speed setting data currently addressed in the speed setting memory means;
   an alternating current source with terminals;
   an electric source synchronous signal generator generating an electric source synchronous signal, said electric source synchronous signal generator being formed to issue a low level of pulse signal as said electric source synchronous signal in response to zero potential between said terminals;
   a rising edge detecting circuit means for detecting a rising of said electric source synchronous signal, said rising edge detecting circuit means being formed to issue a high level of pulse signal when detecting said rising of said electric source synchronous signal, said speed setting data memory means being responsive to said rising edge detecting circuit means during issuance of a high level of pulse signal by said rising edge detecting circuit means; and
   a falling edge detecting circuit means for detecting a falling of said electric source synchronous signal, said falling edge detecting circuit means being formed to issue a high level of pulse signal when detecting said falling of said electric source synchronous signal, said speed setting data memory means being responsive to said falling edge detecting 10. A speed control device of an electric sewing machine that has an upper shaft and a motor for rotating the upper shaft, the device comprising:
   means for variably designating a speed of rotation of the motor to output a designated speed of rotation;
   speed setting memory means for storing speed setting data and having speed setting data currently addressed therein;
   detecting means for detecting a speed of the motor;
   drive circuit means responsive to said speed setting memory means and said detecting means for controlling an ignition voltage with respect to the motor; and
   calculation circuit means for addressing said speed setting memory means with updated speed setting data in dependence upon the designated speed of rotation, said calculation circuit means including comparator means comparing the speed setting data currently addressed in the speed setting memory means with the designated speed of rotation, said calculation circuit means being formed to operate in synchronism with an electric source synchronous signal to produce incremented speed setting data which is an incrementation of the speed setting data currently addressed in the speed setting memory means in response to said comparator means and to assign the updated speed setting data with the incremented speed setting data when the designated speed of rotation is greater than the speed setting data currently addressed in the speed setting memory means, said calculating circuit being responsive to said comparator means to assign the updated speed setting data with the designated speed of rotation when the designated speed of rotation is at most equal to the speed setting data currently addressed in the speed setting memory means.

11. A speed control device of an electric sewing machine that has an upper shaft, the device comprising:

a motor for rotating the upper shaft;

drive circuit means for controlling an ignition voltage with respect to said motor;

pedal stepping control means for variably designating an analog value indicative of a desired rotational motor speed;

means for converting said analog value into a digital value;

speed setting data memory means for storing an address value;

means for detecting a rotational speed of the motor;

drive circuit means responsive to said speed setting data memory means and said detecting means for rotating the motor at the designated speed and including a a semi-conductor and a calculator, said calculator being formed to control a conduction time of said semi-conductor element so as to rotate said motor at the designated speed of rotation; and calculation circuit means operating in synchronism with an electric source synchronous signal for comparing said digital value ($AD_S$) with said address value ($ADN_{S-1}$), said calculation circuit means incrementing said address value ($ADN_{S-1}$) into a new address value ($ADN_{S-1+1}$) and addressing said speed setting memory means with said new address value ($ADN_{S-1+1}$) if said digital value ($AD_S$) is greater than said first-mentioned address value ($ADN_{S-1}$), said calculation circuit means addressing said speed setting memory means with said digital value ($AD_S$) if said digital value ($AD_S$) is less than said first-mentioned address value ($ADN_{S-1}$).

* * * * *